April 28, 1942. G. WIEMER 2,281,125
LEAK INDICATOR
Filed July 27, 1940
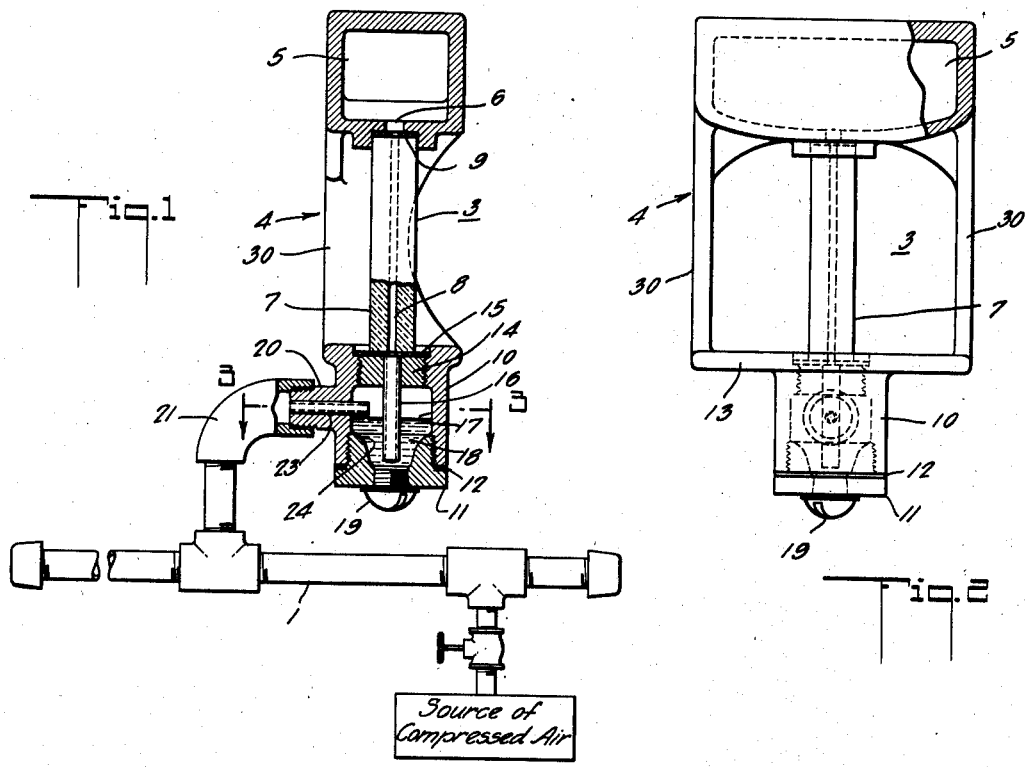
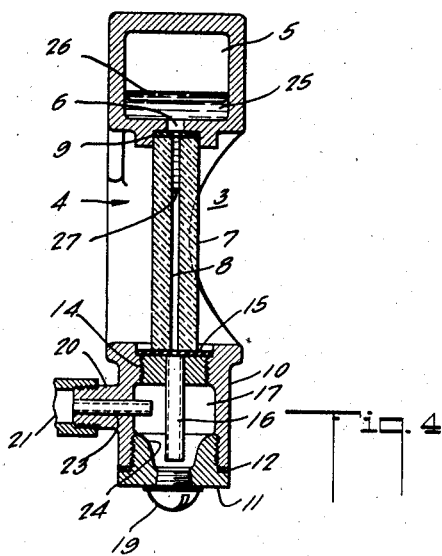
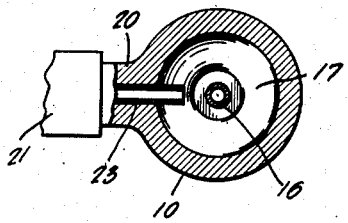
INVENTOR
Gustav Wiemer
BY John Flam
ATTORNEY Patented Apr. 28, 1942

2,281,125

UNITED STATES PATENT OFFICE 2,281,125

LEAK INDICATOR

Gustav Wiemer, Los Angeles, Calif.

Application July 27, 1940, Serial No. 347,895

4 Claims. (Cl. 116—114)

This invention relates to a device for detecting leaks, such as for pipe lines.

Installation of pipes and their appropriate fittings, for conducting gaseous or liquid commodities involves some hazards due to slow leaks. For example, plumbers often install gas pipes in buildings. It is highly desirable to make it possible to detect slow leaks while the building is under construction. Otherwise the cost of repairing leaks becomes excessive, and there is also a likelihood that the leak remains undetected until there is a dangerous accumulation.

It is one of the objects of this invention to make it possible to detect leaks in an expeditious manner.

It is another object of this invention whereby slow leaks may be detected by viewing the movement of a liquid level in a glass gauge tube.

It is still another object of this invention to provide an improved and simplified apparatus for detecting leaks.

This invention possesses many other advantages, and has other objects which may be made more easily apparent from a consideration of one embodiment of the invention. For this purpose there is shown a form in the drawing accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawing:

Figure 1 is a side elevation of a system to be tested by a leak detector incorporating the invention, a portion of the leak detector being in section;

Fig. 2 is a front elevation of a leak detector;

Fig. 3 is a sectional view taken along plane 3—3 of Fig. 1; and

Fig. 4 is a longitudinal sectional view of the leak detector shown in the process of obtaining leak indications.

In the present instance, a system of connected pipes 1 is illustrated in Fig. 1 as representative of a system to be tested. These pipes may be water or gas pipes or the like, leading to appropriate outlets. The system, after it is ready for testing, is arranged to be connected to a source of compressed air, such as an air hose, for placing the system under gas pressure. When testing the system, all of the outlets are closed and compressed air is allowed to flow into the system.

Slow leaks issuing from the system are difficult to detect by ordinary pressure gauge methods. By the aid of the leak detector 3 adapted to be placed in fluid pressure relationship with the system 1, these slow leaks are readily perceptible.

The leak detector 3 has an open body or frame 4 that may readily be made as a casting, and formed with spaced arms 30 (Fig. 2) that define an open space. At the upper end of the frame 4, there is formed a closed upper chamber 5 appropriately confined by walls of the frame 4. This upper frame 5 is entirely closed except for a downwardly extending port 6. This port 6 is shown as formed in the bottom wall of the chamber 5. A glass capillary tube 7 having a small bore 8 is placed at its upper end into communication with the port 6. A rubber or other yielding gasket washer 9 may be interposed between the lower wall of chamber 5 and the upper edge of the tube 7 in order to maintain a fluid tight seal.

The arrangement is such that the lower end of the tube 8 may be placed into fluid conducting relationship with the system 1 under test. The pressure exerted by the compressed air in the system 1 in the bore 8 of the tube 7 acts upon the lower end of a liquid piston, the upper end of which is exposed in the chamber 5. The lower level of the liquid piston, when the device is in operation, is observed in tube 7, and a lowering of this level is indicative of a leak.

The manner in which the liquid piston is positioned to effect these results will be described hereinafter. For the present, the structure of the frame 4 making it possible to connect the lower end of the tube 7 to the system 1 will be described.

The frame 4 carries at its lower end a downwardly extending hollow boss 10. This boss 10 has an internally threaded opening at the bottom thereof, which is adapted to be closed by a correspondingly threaded cap or cover 11. A sealing gasket 12 may be interposed between the flange of the cover 11 and the lower edge of the boss 10.

The upper end of the boss 10 is shown as formed integrally with the bottom wall 13 of the frame 4. This end likewise has an internally threaded aperture adapted to be closed by a plug 14. Interposed between the top of the plug 14 and the bottom of the glass tube 7 is a rubber or other yielding sealing washer 15. The plug 14 furthermore carries a downwardly extending tube 16 in communication with the bore 8 of the tube 7. This tube may be forced into an appropriate aperture in plug 14. Tube 16 extends almost to the bottom of the chamber 17 formed within the boss 10. By appropriate manipulation of the plug 14 within the threads in boss 10, the glass tube 7 can be appropriately clamped and sealed in the upright position illustrated in Figs. 1 and 4.

The chamber 17, defined by the cover 11 and the plug 14, is adapted to hold a body of liquid 18. This body of liquid 18 may be drained, if required, through an opening in the bottom of the cover 11 normally closed by screw plug 19.

The boss 10 has a side extension 20 which is exteriorly threaded to receive any appropriate fitting 21 communicating with the system 1. In the extension 21 there is fixed a hollow tube 23 conducting fluid pressure into the chamber 17. This tube 23 as shown most clearly in Figs. 1, 3 and 4 extends a considerable distance beyond the inner wall of the chamber 17. In this way inversion of the leak detector 3 or tilting thereof will not result in the flow of any of the liquid 18 into the fitting 21.

The body of liquid 18 is sufficient to keep the bottom of the tube 10 covered while the liquid 18 is in this lower chamber. The volume of chamber 17 is purposely made quite small, as by appropriate thickening of the walls of the cap 11, indicated at 24. Accordingly a comparatively small body of liquid 18 is sufficient to bring the level of the liquid normally considerably above the bottom of the tube 10 when the leak indicator is not in use.

The bore 8 of the glass tube 7 is visible to an observer, since it extends from top to bottom of the open frame 4. This bore is purposely made quite small in diameter, of the order of .080 inch. The chamber 5 has a horizontal cross section very much greater than that of the bore 8; and preferably the body of liquid 18 is comparatively light, such as oil. This oil may be appropriately colored, to assist visibility.

When the system 1 is to be tested, the leak detector 4 is connected in place, the body of liquid 18 being then in the bottom of the hollow boss 10. Then compressed air or other gas medium is pumped into the system. Pressure exerted on the top surface of the body of the liquid 18 drives the liquid up to the position illustrated in Fig. 4. Here the liquid is represented by the reference character 25, having an upper liquid level 26 and a lower liquid level 27. This lower liquid level is considerably above the bottom of the tube 7. It is balanced in the position shown by the opposed pressures exerted on the opposite levels 26 and 27. The position of the lower level 27 is sensitive to the pressure existing in the system 1. This is clear from the following considerations.

When gas pressure is applied to the top level of the liquid 18 in the position of Fig. 1, the liquid is forced upwardly through the tube 16 into the glass tube 7, and at least partially into the chamber 5. This continues until there is an equilibrium between the pressure exerted on the upper and lower surfaces 26 and 27 of the liquid piston 25. Thus the pressure exerted on the lower level 27 of the liquid is balanced by the gravity head represented by the height of the liquid piston, plus the pressure of the air confined in the space of chamber 5 above the level 26.

Upon pumping up the system, therefore, the observer notes the position of the lower level 27. If there are no leaks in the system, this lower level stays constant. Should there be leaks, however, the lower level gradually drops and if the leak is quite rapid, then the body of liquid quite rapidly drops down into the chamber 17.

Since the bore 8 of tube 7 is very small, even a considerable lowering of the lower level 27 corresponds to a very small change in pressure, because the total volume of liquid passing out of chamber 5 is nevertheless small. This corresponds to a small change in volume of the gas trapped in chamber 5, which in turn corresponds to a very small change in the gas pressure above the level 26. Accordingly when the pressure exerted on the lower level 27 is reduced, even very slightly, there is a considerable lowering of the level 27. It may be readily proved that if the volume of the gas or air trapped in chamber 5 is 1.41 cubic inches (as in an actual embodiment), and if the bore 8 is .080 inch in diameter, then a reduction of pressure from 24.7 pounds to 24.612 pounds corresponds to a drop in the oil level of .1 inch. This is readily noted, although the difference in the pressures is only .088 pound.

What is claimed is:

1. In a leak detector for a system of connected fluid passages, means forming an upper closed liquid chamber, means forming a downwardly directed transparent conduit communicating with the chamber and having a cross section for the downward flow of liquid that is much smaller than that of the chamber, means forming a lower passageway adapted to be connected to the system under test, and in communication with the lower end of the conduit, and a liquid piston adapted to operate partly in the conduit and partly in the upper chamber.

2. In a leak detector for a system of connected fluid passages, means forming an upper closed liquid chamber, means forming a downwardly directed transparent conduit communicating with the chamber and having a cross section for the downward flow of liquid that is much smaller than that of the chamber, means for connecting the lower end of the conduit to the system under test, and a liquid of light specific gravity forming a piston operating so that its lower level is above the bottom of the conduit, said liquid extending into the upper chamber.

3. In a leak detector for a system of connected fluid passages, means forming an upper closed liquid chamber, means forming a downwardly directed transparent conduit communicating with the chamber and having a cross section for the downward flow of liquid that is much smaller than that of the chamber, means forming a lower passageway adapted to be connected to the system under test, and in communication with the lower end of the conduit, and a body of liquid having a lower level that is above the bottom of the conduit, said body extending at least partly into the upper chamber, whereby variations in the lower level of the liquid in the conduit correspond to variations in the pressure operating upon the top and bottom levels of the liquid.

4. In a leak detector for a system of connected fluid passages, means forming a chamber closed except for an elongated transparent conduit of small cross section that extends from the chamber, liquid means in the conduit for providing a closure for the chamber, said liquid means extending into the chamber beyond the conduit, the lower end thereof being exposed in the conduit, and means for subjecting that area of the liquid means which is exposed in the conduit to the pressure of the fluid passages.

GUSTAV WIEMER.